(12) United States Patent
Pezzimenti et al.

(10) Patent No.: US 10,806,199 B2
(45) Date of Patent: *Oct. 20, 2020

(54) COLD WEATHER VENTED GARMENT

(71) Applicant: NIKE, Inc., Beaverton, OR (US)

(72) Inventors: Luke A. Pezzimenti, Portland, OR (US); Lindsey V. J. Martin, Portland, OR (US); Irena Ilcheva, Beaverton, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/391,187

(22) Filed: Dec. 27, 2016

(65) Prior Publication Data
US 2017/0105467 A1  Apr. 20, 2017

Related U.S. Application Data

(63) Continuation of application No. 15/140,214, filed on Apr. 27, 2016, now Pat. No. 10,362,820, which is a
(Continued)

(51) Int. Cl.
*A41D 27/28* (2006.01)
*A41D 31/06* (2019.01)
(Continued)

(52) U.S. Cl.
CPC .............. *A41D 27/28* (2013.01); *A41D 27/24* (2013.01); *A41D 27/245* (2013.01); *A41D 31/065* (2019.02); *A41D 31/102* (2019.02)

(58) Field of Classification Search
CPC . A41D 27/28; A41D 1/04; A41D 3/00; A41D 13/0015; A41D 27/245;
(Continued)

(56) References Cited

U.S. PATENT DOCUMENTS

| 317,711 | A | * | 5/1885 | Brinkmann | ............ | A41D 27/28 2/118 |
| 385,306 | A | * | 6/1888 | Helwitz | ................. | A41D 27/28 2/87 |

(Continued)

FOREIGN PATENT DOCUMENTS

| CN | 2337793 Y1 | 9/1999 |
| CN | 1864574 A | 11/2006 |

(Continued)

OTHER PUBLICATIONS

Non-Final Office Action dated Jun. 30, 2017 in U.S. Appl. No. 14/877,199, 8 pages.
(Continued)

*Primary Examiner* — Alissa L Hoey
(74) *Attorney, Agent, or Firm* — Shook, Hardy and Bacon LLP

(57) ABSTRACT

The present invention relates to breathable, vented, and insulating cold weather garments. More particularly, the present invention relates to garments with chambers to retain an insulating fill material. Perforations along the seams between the insulating chambers may achieve optimal evaporative moisture transfer from the inside (proximal to the body of a wearer) of the garment to the outside environment.

4 Claims, 7 Drawing Sheets

Related U.S. Application Data continuation of application No. 13/449,783, filed on Apr. 18, 2012, now Pat. No. 9,392,825.

(51) Int. Cl.
  *A41D 31/02* (2019.01)
  *A41D 27/24* (2006.01)
  *A41D 31/102* (2019.01)

(58) Field of Classification Search
  CPC .......... A41D 2400/20; A41D 2400/22; A41D 2300/50; A41D 2300/52; B29C 66/436
  USPC .......................................... 2/69, 87, DIG. 1
  See application file for complete search history.

(56) References Cited

U.S. PATENT DOCUMENTS

| | | | |
|---|---|---|---|
| 1,252,187 A * | 1/1918 | Shane | A41D 3/04 2/87 |
| 1,252,188 A * | 1/1918 | Shane | A41D 3/04 2/87 |
| 1,612,010 A * | 12/1926 | Gray | A41B 1/00 2/115 |
| 1,788,731 A * | 1/1931 | Hyman | A41D 3/04 2/87 |
| 2,084,173 A * | 6/1937 | Wexler | A41D 27/28 2/87 |
| 2,121,836 A | 6/1938 | Steinberger et al. | |
| 2,353,984 A * | 7/1944 | Barone | A41D 27/28 112/414 |
| 2,372,632 A | 3/1945 | Webb et al. | |
| 2,385,124 A * | 9/1945 | Barone | A41D 27/28 112/426 |
| 2,464,380 A | 3/1949 | Daiber | |
| 2,466,911 A * | 4/1949 | Raymond | A41D 27/28 2/87 |
| 2,851,390 A * | 9/1958 | Chavannes | A41D 31/0016 156/252 |
| 3,115,564 A | 12/1963 | Stacy | |
| 3,405,674 A * | 10/1968 | Coates | D04H 1/52 112/420 |
| 3,562,041 A | 2/1971 | Robertson | |
| 3,706,102 A | 12/1972 | Grenier | |
| 3,761,962 A * | 10/1973 | Myers | A41D 27/28 2/227 |
| 3,771,170 A | 11/1973 | Leon | |
| 3,819,465 A | 6/1974 | Parsons et al. | |
| 3,852,144 A | 12/1974 | Parry | |
| 3,876,493 A | 4/1975 | Gilmore | |
| 4,039,709 A | 8/1977 | Newman | |
| 4,048,675 A * | 9/1977 | Griffin | A41D 3/00 2/108 |
| 4,115,610 A | 9/1978 | Wortman | |
| 4,181,993 A | 1/1980 | McDaniel | |
| 4,185,327 A | 1/1980 | Markve | |
| 4,251,312 A | 2/1981 | Ziegler, Jr. et al. | |
| 4,311,542 A | 1/1982 | Mueller et al. | |
| 4,370,754 A * | 2/1983 | Donzis | A41D 13/0153 2/16 |
| 4,396,039 A | 8/1983 | Klenk et al. | |
| 4,471,759 A | 9/1984 | Anderson et al. | |
| 4,496,407 A | 1/1985 | Lowery, Sr. et al. | |
| 4,502,153 A | 3/1985 | Lapedes et al. | |
| 4,560,427 A | 12/1985 | Flood | |
| 4,604,152 A * | 8/1986 | Liukko | A41D 27/245 156/93 |
| 4,608,715 A * | 9/1986 | Miller | A41D 27/285 2/1 |
| 4,610,750 A | 9/1986 | Mango | |
| 4,625,336 A * | 12/1986 | Derderian | A41D 13/0015 2/227 |
| 4,693,771 A | 9/1987 | Payet et al. | |
| 4,713,131 A | 12/1987 | Obeda | |
| 4,716,598 A * | 1/1988 | Bertram | A01K 13/008 2/102 |
| 4,737,212 A | 4/1988 | Emrich et al. | |
| 4,756,937 A | 7/1988 | Mentzer | |
| 4,788,972 A * | 12/1988 | DeBusk | A61F 5/01 2/DIG. 1 |
| 4,791,685 A | 12/1988 | Maibauer | |
| 4,938,817 A | 7/1990 | Langley | |
| 4,962,554 A * | 10/1990 | Tesch | A47G 9/0207 112/420 |
| 4,971,041 A | 11/1990 | Millikan et al. | |
| 5,001,783 A | 3/1991 | Grilliot et al. | |
| 5,003,902 A * | 4/1991 | Benstock | A41D 27/24 112/402 |
| 5,021,280 A | 6/1991 | Farnworth et al. | |
| 5,048,126 A | 9/1991 | McLaughlin | |
| 5,067,178 A | 11/1991 | Katchka et al. | |
| 5,131,097 A | 7/1992 | Grilliot et al. | |
| 5,165,115 A | 11/1992 | Stanislaw et al. | |
| 5,168,576 A * | 12/1992 | Krent | A41D 13/0156 2/16 |
| 5,255,392 A | 10/1993 | Stanislaw et al. | |
| 5,267,519 A | 12/1993 | Uglene et al. | |
| 5,408,700 A * | 4/1995 | Reuben | A41D 27/02 112/402 |
| 5,445,863 A | 8/1995 | Slagle et al. | |
| 5,446,927 A | 9/1995 | Weldon | |
| 5,483,713 A | 1/1996 | Kikuchi et al. | |
| 5,526,534 A | 6/1996 | Lazar | |
| 5,665,196 A | 9/1997 | Combe et al. | |
| 5,692,245 A * | 12/1997 | Reuben | A41D 27/02 112/420 |
| 5,713,079 A * | 2/1998 | Simon | A41D 3/00 2/243.1 |
| 5,787,502 A | 8/1998 | Middleton | |
| 5,799,600 A * | 9/1998 | Reuben | A47G 9/0207 112/420 |
| 5,885,679 A * | 3/1999 | Yasue | A41D 27/24 156/73.4 |
| 5,924,134 A | 7/1999 | Taylor et al. | |
| 5,935,878 A * | 8/1999 | Glasser | A41D 31/02 442/1 |
| 6,009,560 A * | 1/2000 | McKenney | A41D 13/01 2/244 |
| 6,018,819 A | 2/2000 | King et al. | |
| 6,038,700 A | 3/2000 | Aldridge et al. | |
| 6,049,908 A | 4/2000 | Bullock et al. | |
| 6,076,196 A | 6/2000 | Masumoto | |
| 6,112,328 A | 9/2000 | Spector | |
| 6,182,297 B1 | 2/2001 | Duren et al. | |
| 6,279,161 B1 * | 8/2001 | Johnston | A41D 27/08 2/115 |
| 6,332,221 B1 | 12/2001 | Gracey | |
| 6,339,843 B1 | 1/2002 | Grilliot et al. | |
| 6,405,375 B1 | 6/2002 | Sardi | |
| 6,547,327 B1 | 4/2003 | Yates | |
| 6,579,403 B2 | 6/2003 | Tolbert et al. | |
| 6,649,251 B1 | 11/2003 | Druecke et al. | |
| 6,805,181 B2 | 10/2004 | Blundell et al. | |
| 6,817,037 B1 | 11/2004 | King | |
| 6,928,665 B1 | 8/2005 | Yates | |
| 7,005,021 B2 | 2/2006 | Kramer | |
| 7,051,373 B1 | 5/2006 | Krall | |
| 7,094,714 B2 | 8/2006 | Lap et al. | |
| 7,111,328 B2 | 9/2006 | Bay | |
| 7,140,048 B2 | 11/2006 | Wallerstein | |
| 7,147,911 B2 | 12/2006 | Baychar | |
| 7,578,005 B2 | 8/2009 | Vereen | |
| 7,757,311 B2 * | 7/2010 | Garneau | A41D 1/084 2/215 |
| 7,827,624 B1 | 11/2010 | Cole | |
| 7,926,124 B2 | 4/2011 | Hunter et al. | |
| 8,028,386 B2 | 10/2011 | Rock et al. | |
| 8,057,878 B2 | 11/2011 | Lo et al. | |
| 8,070,905 B2 | 12/2011 | Brennan | |
| 8,127,701 B2 * | 3/2012 | Harward | A41D 27/24 112/475.17 |

(56) References Cited

U.S. PATENT DOCUMENTS

| | | | |
|---|---|---|---|
| 8,133,824 B2* | 3/2012 | Harber | A41D 1/04 156/209 |
| 8,377,536 B2 | 2/2013 | Cienski | |
| 8,399,085 B2 | 3/2013 | Moore, III et al. | |
| 8,458,819 B1 | 6/2013 | Hoole | |
| 8,518,511 B2 | 8/2013 | Harward | |
| D693,095 S | 11/2013 | Grant | |
| 8,578,516 B2 | 11/2013 | Li | |
| 8,756,714 B2 | 6/2014 | Eimer | |
| D713,620 S | 9/2014 | Pezzimenti et al. | |
| D713,621 S | 9/2014 | Pezzimenti et al. | |
| D714,022 S | 9/2014 | Mong et al. | |
| 8,828,167 B2 | 9/2014 | Hannon | |
| 8,840,745 B2 | 9/2014 | Green | |
| 9,023,161 B2 | 5/2015 | Ma et al. | |
| 9,138,060 B2 | 9/2015 | Vainberg et al. | |
| 9,247,830 B2 | 2/2016 | Waters et al. | |
| 9,392,825 B2* | 7/2016 | Pezzimenti | A41D 27/245 |
| 9,609,901 B2 | 4/2017 | Nordstrom et al. | |
| 10,111,480 B2 | 10/2018 | Pezzimenti | |
| 10,362,820 B2 | 7/2019 | Pezzimenti et al. | |
| 2002/0183671 A1 | 12/2002 | Henderson et al. | |
| 2003/0033656 A1* | 2/2003 | Jaeger | A41D 27/28 2/69 |
| 2003/0126673 A1 | 7/2003 | Yardley | |
| 2003/0138586 A1 | 7/2003 | Fowler | |
| 2003/0208831 A1* | 11/2003 | Lazar | A41D 13/0053 2/69 |
| 2004/0083538 A1 | 5/2004 | Thomas | |
| 2004/0111782 A1 | 6/2004 | Lenormand et al. | |
| 2005/0124256 A1 | 6/2005 | Mason et al. | |
| 2005/0159056 A1 | 7/2005 | Lap et al. | |
| 2005/0249917 A1 | 11/2005 | Trentacosta et al. | |
| 2006/0059601 A1* | 3/2006 | Opitz | A41D 3/00 2/108 |
| 2006/0165939 A1 | 7/2006 | Hottner | |
| 2006/0185053 A1 | 8/2006 | Wittmann et al. | |
| 2006/0240234 A1 | 10/2006 | O'Neill et al. | |
| 2007/0026186 A1* | 2/2007 | Chapuis | B29C 65/5021 428/57 |
| 2007/0083985 A1 | 4/2007 | Nathan et al. | |
| 2007/0245448 A1* | 10/2007 | Bury | A41D 3/00 2/108 |
| 2007/0294800 A1* | 12/2007 | Huang | A41D 3/00 2/97 |
| 2008/0005823 A1* | 1/2008 | Hung | A41D 31/00 2/69 |
| 2008/0127395 A1 | 6/2008 | Blauer | |
| 2008/0295216 A1 | 12/2008 | Nordstrom et al. | |
| 2009/0089911 A1* | 4/2009 | Smith | A41D 3/04 2/69 |
| 2009/0155543 A1 | 6/2009 | Fowler | |
| 2009/0233042 A1 | 9/2009 | Sadato et al. | |
| 2009/0314696 A1 | 12/2009 | Trentacosta et al. | |
| 2010/0138977 A1 | 6/2010 | Lin | |
| 2010/0143669 A1 | 6/2010 | Abrams | |
| 2010/0281595 A1 | 11/2010 | Gemes | |
| 2010/0287680 A1 | 11/2010 | Johnson et al. | |
| 2010/0291825 A1* | 11/2010 | Johnson | D06P 1/90 442/289 |
| 2011/0119811 A1 | 5/2011 | Rock et al. | |
| 2011/0125125 A1 | 5/2011 | Schneider et al. | |
| 2011/0296580 A1* | 12/2011 | Demarest | A41D 27/28 2/69 |
| 2012/0005829 A1 | 1/2012 | Waters et al. | |
| 2012/0005831 A1 | 1/2012 | Waters et al. | |
| 2012/0017346 A1 | 1/2012 | Reimer | |
| 2012/0114883 A1 | 5/2012 | Kapur et al. | |
| 2012/0222189 A1 | 9/2012 | Sokolowski et al. | |
| 2012/0328824 A1 | 12/2012 | Cartabbia | |
| 2013/0014317 A1 | 1/2013 | Ly | |
| 2013/0038104 A1 | 2/2013 | Burns et al. | |
| 2013/0061366 A1 | 3/2013 | Pezzimenti | |
| 2013/0177731 A1 | 7/2013 | Moriarty | |
| 2013/0255103 A1 | 10/2013 | Dua et al. | |
| 2013/0276201 A1 | 10/2013 | Pezzimenti | |
| 2013/0277349 A1 | 10/2013 | Pezzimenti | |
| 2014/0304896 A1 | 10/2014 | Nordstrom et al. | |
| 2014/0349057 A1 | 11/2014 | Blackford et al. | |
| 2015/0044943 A1 | 2/2015 | Marshall et al. | |
| 2016/0183613 A1 | 6/2016 | Martin | |
| 2016/0213077 A1 | 7/2016 | Sung | |
| 2016/0235147 A1 | 8/2016 | Pezzimenti et al. | |
| 2016/0278459 A1 | 9/2016 | Hilty | |
| 2016/0366962 A1 | 12/2016 | Ilcheva et al. | |
| 2016/0366963 A1* | 12/2016 | Koshkaroff | A41D 27/28 |
| 2017/0028669 A1 | 2/2017 | Regester et al. | |
| 2017/0065005 A1* | 3/2017 | Nordstrom | A41D 13/002 |
| 2017/0099899 A1 | 4/2017 | Pezzimenti et al. | |
| 2017/0245560 A1 | 8/2017 | Pezzimenti et al. | |

FOREIGN PATENT DOCUMENTS

| | | |
|---|---|---|
| CN | 2927724 A | 8/2007 |
| CN | 101731767 A | 6/2010 |
| CN | 201782000 U | 4/2011 |
| CN | 201929015 U | 8/2011 |
| CN | 201999883 U | 10/2011 |
| CN | 202122098 U | 1/2012 |
| CN | 202233137 U | 5/2012 |
| CN | 103358606 A | 10/2013 |
| CN | 204340295 U | 5/2015 |
| CN | 205072100 U | 3/2016 |
| CN | 206182403 U | 5/2017 |
| EP | 1325976 A1 | 7/2003 |
| EP | 2617306 A1 | 7/2013 |
| JP | 2001192901 A | 7/2001 |
| JP | 2005226173 A | 8/2005 |
| KR | 20090113413 A | 11/2009 |
| KR | 200454066 Y1 | 6/2011 |
| KR | 200455836 Y1 | 9/2011 |
| WO | 2003057975 A1 | 7/2003 |
| WO | 2004082413 A1 | 9/2004 |
| WO | 2013070086 A1 | 5/2013 |
| WO | 2014062067 A1 | 4/2014 |
| WO | 2014087161 A1 | 6/2014 |

OTHER PUBLICATIONS

European Search Report dated Nov. 18, 2016 in European Patent Application No. 16179320.3, 8 pages.

"Nike Aeroloft," Nike. Last accessed Jan. 23, 2015 at: http://www.nike.com/us/en_us/c/running/aeroloft.

"78678 North End Sport Pursuit 3-Layer Hybrid Soft Shell Jacket with Laser Perforation," Seasons Outfitters, seasonsoutfitters.com; Last accessed Jan. 23, 2015 at: http://www.seasonsoutfitters.com/index.php/outerwear-32/waterproof/78678-pursuitladies-3-layer-light-bonded-hybrid-soft-shell-jacket-with-laser-perforation.html.

"Mavic Helium Jacket (Men's)," MEC, mec.ca Last accessed Jan. 23, 2015 at: http://www.mec.ca/product/5038-526/mavic-helium-jacket-mens/.

"Salomon Men's S-Lab Hybrid Jacket," Running Warehouse, runningwarehouse.com Last accessed Jan. 23, 2015 at: http://www.runningwarehouse.com/Salomon_Mens_S-Lab_Hybrid_Jacket/descpage-SMSLHJ.html.

"Women's Better than Naked™ Cool Jacket," The North Face®, thenorthface.com Last accessed Jan. 23, 2015 at: http://www.thenorthface.com/catalog/sc-gear/women-39-s-better-than-nakedcool-jacket.html.

"88680: Ventilate—Men's Seam-Sealed Insulated Jacket," Alphabroder, ashcity.com Last accessed Jan. 23, 2015 at: http://www.ashcity.com/en-ca/products/outerwear/insulated-seam-sealed/88680-ventilate-mens-nbsp-3bseam-sealed-insulated-jacket.html.

"W's C9 Loft Jacket," Houdini, houdinisportswear.com Last accessed Jan. 23, 2015 at: http://www.houdinisportswear.com/en/women/womens-c9-loft-jacket.

"Laser Perforated Jacket," Akris punto, Nordstrom, Item # 251033. Last accessed Jan. 23, 2015 at: http://shop.nordstrom.com/s/akris-punto-laser-perforated-jacket/3667112.

(56) References Cited

OTHER PUBLICATIONS

"Greenland Baffled Jacket," Marmot® for Life, marmot.com, #5067. Last accessed Jan. 23, 2015 at: http://marmot.com/products/details/greenland-baffled-jacket.
"Woman's Aconcagua Jacket," The North Face, thenorthface.com. Last accessed Jan. 23, 2015 at: http://www.thenorthface.com/catalog/sc-gear/womens-jackets-vests/women-8217-saconcagua-jacket.html.
"Rab Microlight Alpine Down Jacket," backcountry.com, Item #RAB0244. Last accessed Jan. 23, 2015 at: http://www.backcountry.com/rab-microlight-alpine-down-jacketwomens?CMP_SKU=RAB0244&MER=0406&skid=RAB0244-ORC-USXLUS16.
"Women's Old Navy Active Front-Quilted Jackets," Old Navy, oldnavy.gap.com Last accessed Jan. 23, 2015 at: http://oldnavy.gap.com/browse/product.do?vid=1&pid=172238002.
"Quilted Front Down Sweater Jacket," Moncler, Nordstrom, Item #803724. Last accessed Jan. 23, 2015 at: http://shop.nordstrom.com/s/moncler-quilted-front-down-sweater-jacket/3900159.
"Pizzoli' Knit & Quilted Jacket," Boss Hugo Boss, Nordstrom, Item #73989. Last accessed Jan. 23, 2015 at: http://shop.nordstrom.com/s/boss-hugo-boss-pizzoli-knit-quilted-jacket/3782194.
"Barbour Mens Chukka Quilted Jacket Military Brown Navy," Barbour, coveredbridgecyclery.com Last accessed Jan. 23, 2015 at: http://www.coveredbridgecyclery.com/barbour-mens-chukka-quilted-jacket-militarybrown-navy-1423.html.
Angel, "Trend: Quilted Textures," youlookfab.com, Jul. 15, 2013. Last accessed Jan. 23, 2015 at: http://youlookfab.com/2013/07/15/trend-quilted-textures/.
Bendzovski, Daniel, "Trend-sandwich: Exploring new ways of joining inspiration, such as different kinds of trends, through processes of morphing and melding different trendy garments and materials, for new methods, garment types, materials and expressions," Univ. of Borås, 2015. http://www.diva-portal.org/smash/get/diva2:825758/FULLTEXT01.pdf.
International Search Report and Written Opinion dated Dec. 20, 2016 in International Patent Application No. PCT/US2016/054798, 11 pages.
International Search Report and Written Opinion dated Dec. 18, 2017 in International Patent Application No. PCT/US2017/049833, 14 pages.
International Search Report and Written Opinion dated Dec. 18, 2017 in International Patent Application No. PCT/US2017/049840, 13 pages.
International Search Report and Written Opinion dated Dec. 20, 2017 in International Patent Application No. PCT/US2017/055094, 14 pages.
International Search Report and Written Opinion dated Dec. 20, 2017 in International Patent Application No. PCT/US2017/055095, 13 pages.
International Search Report and Written Opinion dated Dec. 20, 2017 in International Patent Application No. PCT/US2017/055308, 14 pages.
Notice of Allowance dated Mar. 5, 2018 in U.S. Appl. No. 14/877,199, 5 pages.
International Preliminary Report on Patentability dated Apr. 19, 2018 in International Patent Application No. PCT/US2016/055626, 8 pages.
Non-Final Office Action dated Jun. 5, 2018 in U.S. Appl. No. 15/286,929, 12 pages.
Non-Final Office Action dated Jun. 14, 2018 in U.S. Appl. No. 15/140,214, 13 pages.
Non-Final Office Action dated Jul. 3, 2018 in U.S. Appl. No. 15/255,603, 8 pages.
Non-Final Office Action dated Jul. 31, 2018 in U.S. Appl. No. 15/254,749, 8 pages.
Final Office Action dated Oct. 9, 2018 in U.S. Appl. No. 15/286,929, 13 pages.
Office Action received for Canadian Patent Application No. 3034446, dated Jan. 30, 2020, 3 pages.
Final Office Action dated Oct. 30, 2018 in U.S. Appl. No. 15/140,214, 14 pages.
Non-Final Office Action dated Nov. 16, 2018 in U.S. Appl. No. 15/286,913, 13 pages.
Non-Final Office Action dated Nov. 20, 2018 in U.S. Appl. No. 15/255,601, 16 pages.
International Preliminary Report on Patentability dated Mar. 14, 2019 in International Patent Application No. PCT/US2017/049833, 8 pages.
Intention to Grant received for European Patent Application No. 16784652.6, dated Apr. 17, 2020, 6 pages.
Office Action received for Canadian Patent Application No. 3034298, dated Apr. 22, 2020, 5 pages.
Office Action received for Canadian Patent Application No. 3034404, dated Apr. 15, 2020, 6 pages.
Office Action received for Canadian Patent Application No. 3036223, dated Apr. 27, 2020, 6 pages.
Office Action received for Canadian Patent Application No. 3036225, dated Apr. 27, 2020, 6 pages.
Non-Final Office Action dated Feb. 21, 2019 in U.S. Appl. No. 15/254,749, 5 pages.
Non-Final Office Action dated Feb. 21, 2019 in U.S. Appl. No. 15/255,603, 5 pages.
Final Office Action dated Mar. 6, 2019 in U.S. Appl. No. 15/255,601, 16 pages.
Notice of Allowance dated Mar. 13, 2019 in U.S. Appl. No. 15/140,214, 7 pages.
Non-Final Office Action dated Mar. 19, 2019 in U.S. Appl. No. 15/286,929, 11 pages.
International Preliminary Report on Patentability dated Apr. 18, 2019 in International Patent Application No. PCT/US2017/055308, 8 pages.
International Preliminary Report on Patentability dated Apr. 18, 2019 in International Patent Application No. PCT/US2017/055094. 8 pages.
International Preliminary Report on Patentability dated Apr. 18, 2019 in International Patent Application No. PCT/US2017/055095, 7 pages.
Intention to Grant received for European Patent Application No. 16179320.3, dated Jan. 15, 2020, 8 pages.
Office Action received for Sri Lankan Patent Application No. 20396, dated Dec. 23, 2019, 1 page.
Non Final Office Action received for U.S. Appl. No. 15/255,603, dated Mar. 6, 2020, 7 pages.
Non-Final Office Action dated May 1, 2019 in U.S. Appl. No. 15/286,913, 13 pages.
Office Action received for European Patent Application No. 17787086.2, dated May 19, 2020, 5 pages.
Office Action received for European Patent Application No. 17787734.7, dated May 19, 2020, 4 pages.
Office Action received for European Patent Application No. 17787759.4, dated May 19, 2020, 4 pages.
Non-Final Office Action received for U.S. Appl. No. 15/724,702, dated Jan. 30, 2020, 11 pages.
Notice of Allowance received for U.S. Appl. No. 15/255,601, dated Jan. 13, 2020, 7 pages.

* cited by examiner

COLD WEATHER VENTED GARMENT

CROSS-REFERENCE TO RELATED APPLICATIONS

This application, entitled "Cold Weather Vented Garment," is a Continuation Application of pending U.S. application Ser. No. 15/140,214, filed Apr. 27, 2016, entitled "Cold Weather Vented Garment," which, in turn, is a Continuation Application of U.S. application Ser. No. 13/449,783, filed Apr. 18, 2012, entitled "Cold Weather Vented Garment," which is now U.S. Pat. No. 9,392,825, issued Jul. 19, 2016. These are incorporated by reference in their entireties herein.

STATEMENT REGARDING FEDERALLY SPONSORED RESEARCH OR DEVELOPMENT

Not applicable.

TECHNICAL FIELD

The present invention relates to cold weather insulation garments. More particularly, the present invention relates to breathable insulating cold weather garments suitable for short term vigorous aerobic activity such as for example a run, a bike ride, a short hike around the neighborhood, etc.

BACKGROUND OF THE INVENTION

With the desire to stay active year round, there is a need for breathable insulating garments for use during physical activity in the cold weather months. Conventional cold weather garments may not allow for moisture from perspiration to escape from the inside of the garment. The trapping of moisture from perspiration may be particularly problematic for garments constructed from inherently water resistant fabrics. Often, garments with fill material such as down or fibers are constructed of textiles that are resistant to the fill material penetrating the textile, either partially or entirely. Such fill proof textiles may be created using treatments such as a durable water repellant (DWR) or by weaving or knitting a textile of sufficient weight to retain the fill material. These approaches often render the textile water resistant, however. Therefore, these garments may trap moisture inside of the garments, which may then lead to discomfort for the wearer, and eventually may become counterproductive as cold weather insulating garments.

BRIEF SUMMARY OF THE INVENTION

The present invention generally relates to a cold weather garment capable of providing insulation and breathability, thereby overcoming the problem of moisture release from the inside of a cold weather garment in conventional garments. The cold weather vented garment in accordance with the present invention may be especially important, for example, to a wearer undergoing short-term physical exertion, such as aerobic activities like running, biking, hiking, other exercise, and/or physical labor. When a person exerts physically, the normal physiological response is to cool down the body by releasing moisture from the body in the form of perspiration. This physiological response still occurs in cold weather, especially when a person wears heat insulating garments. Therefore, one of the objects of the present invention is to provide a cold weather insulating garment that may protect a wearer from extreme, external environmental conditions while still allowing for moisture from perspiration to escape to the outer environment.

Conventional cold weather garments and cold weather garments in accordance with the present invention may be constructed using fabrics treated with down proofing chemical treatments, and/or water repellants that may also act as down proofing treatments, such chemical treatments referred to as DWR (durable water repellant.) Although DWR is a waterproofing chemical treatment, in addition to waterproofing the fabric, it is also very useful for down proofing fabrics, especially light and ultra-light weight fabrics. For example, fabrics that may particularly benefit from DWR treatment for down proofing are light fabrics (89 $g/m^2$-30 $g/m^2$), and ultra-light fabrics (29 $g/m^2$ or lighter). Down can have very sharp shafts that can poke holes through light weight fabrics, making them more susceptible to tearing or down loss over time. Other types of fill material such as polyester fibers may lack the sharp shafts of down but are still challenging to contain with a light weight textile. Heavier fabrics, such as fabrics with weights in the range of 90 $g/m^2$-149 $g/m^2$, or even 150 $g/m^2$-250 $g/m^2$ or higher may be inherently more resistant to down and may or may not need a down proofing treatment depending on the specific type of fabric/textile, but such fabrics may be used in garments in accordance with the present invention. Lighter weight fabrics may be more desirable in the manufacture of insulation garments in order to keep the garments reasonably light weight, especially in the manufacture of athletic and/or high aerobic activity insulating garments.

The insulating garment in accordance with the present invention may be manufactured from a light weight fabric and may comprise a number of insulating, down or synthetic fiber filled chambers, separated by seams. Seams separating chambers may be spaced at varying intervals and may have any orientation and/or shape. The seams may be formed by actively adhering two layers of fabric together with a suitable adhesive tape material, by stitching two layers of fabric together, or both using the adhesive tape and stitching. In the case of certain fabrics, a tape may not be needed if the fabrics can be bonded without the use of tape. After the seams are formed, the seams may then be perforated with a laser cutter, an ultrasonic cutting wheel. Given the right equipment, the bonding and perforating steps may be performed simultaneously, for example by using a welding and cutting wheel. The plurality of perforations are located on the seams and are cut through the seams. The plurality of perforations may be of different shapes and sizes and may create different patterns. The plurality of perforations may be continuous along the seams, or may be intermittently placed along the seams, or alternatively, the plurality perforations may be placed strategically only on the seams that are located close to areas where perspiration may be particularly high, such as along the back of a wearer or under the arms of a wearer. The size and frequency of the plurality of perforations may be optimized to allow a desired level of ventilation, while still maintaining heat insulation close to the body of the wearer.

In one example of the garment in accordance with the present invention, the garment may be a standalone garment. The garment may be in the form of a vest covering a person's body core area, a jacket with sleeves, a total body suit, etc., when in an as-worn configuration.

Alternatively, the garment in accordance with the present invention may be used as a removable inner insulating layer having an outer shell which may or may not be weather proof. This inner insulating layer may also be worn as a standalone garment when detached from the outer shell.

Like in the previous example, the removable inner insulating layer may be presented as a vest, a jacket, a body suit, etc., depending on the type of garment and protection desired. For example, if the outer shell is a long sleeved jacket, the insulating layer may be presented as a vest, a jacket, or a jacket with removable sleeves to convert into a vest, depending on the amount of insulation desired. The insulating layer may be fastened to the outer shell by a zipper mechanism, buttons, hook and loop fasteners, or any other fastening mechanism available in the market, and/or any combination of fastening mechanisms available.

Further, the garment in accordance with the present invention may be engineered into an outer shell. In other words, instead of being removable, an insulating and breathable garment in accordance with the present invention may be permanently attached to the outer shell. This may be achieved by stitching the outer shell to the inner insulating and breathable layer at garment forming seams, meaning the seams located at the top of the shoulders, and/or the side seams running from under the arm socket of a wearer along the length of the garment to the bottom end of the garment. Alternatively, an insulating and breathable layer may be integrated into an outer shell layer by forming the shell from the same textile as one or both of the textiles that form the chambers, by knitting or weaving the shell to the inner layer, using adhesive, etc.

Additional objects, advantages, and novel features of the invention will be set forth in part in the description which follows, and in part will become apparent to those skilled in the art upon examination of the following, or may be learned by practice of the invention.

BRIEF DESCRIPTION OF THE SEVERAL VIEWS OF THE DRAWING

The present invention is described in detail below with reference to the attached drawing figures, wherein.

DETAILED DESCRIPTION OF THE INVENTION

Figure 1A:
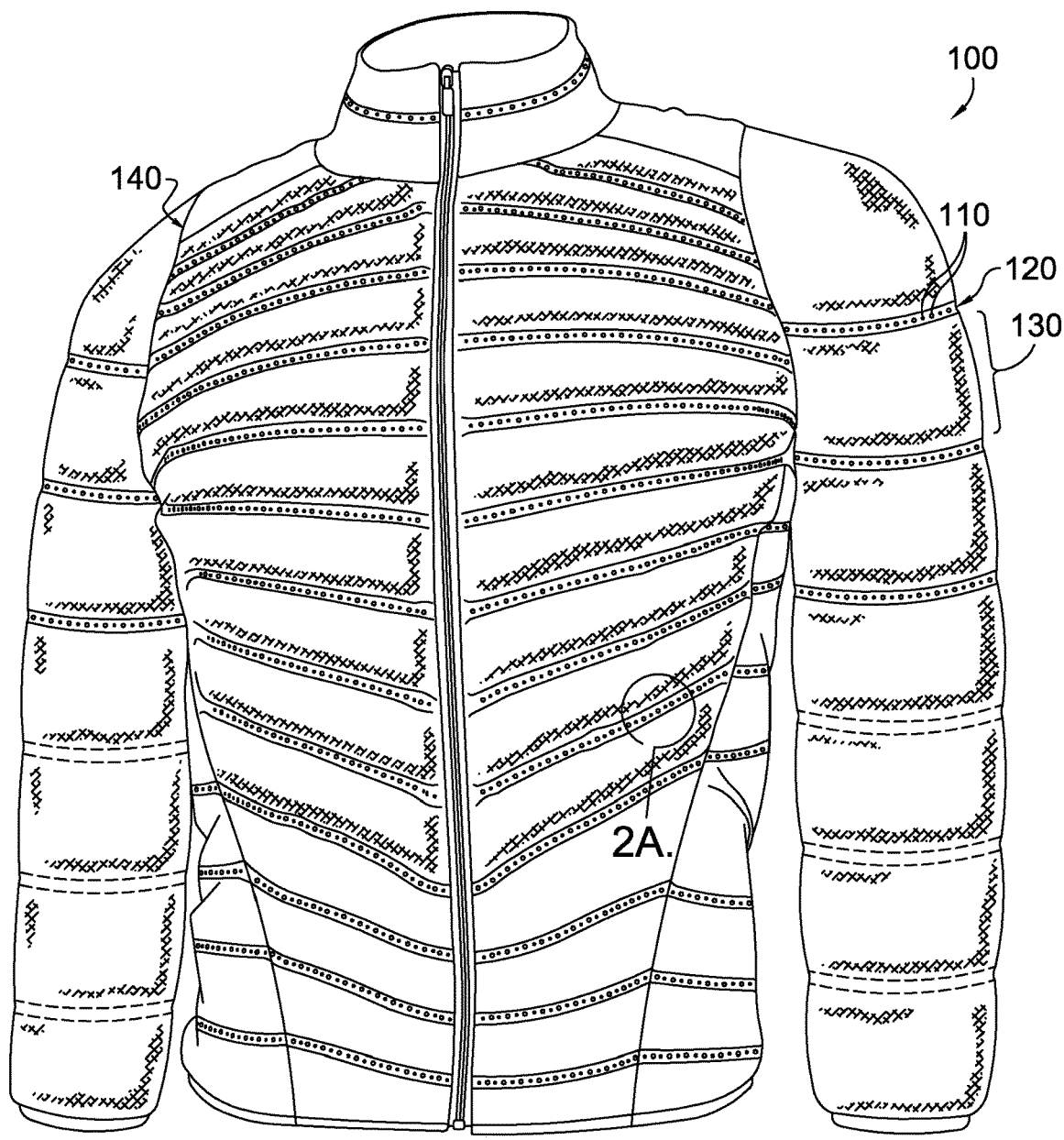
FIGS. 1A and 1B are a front and back view, respectively, of an exemplary cold weather vented garment in accordance with the present invention.
Figure 1B:
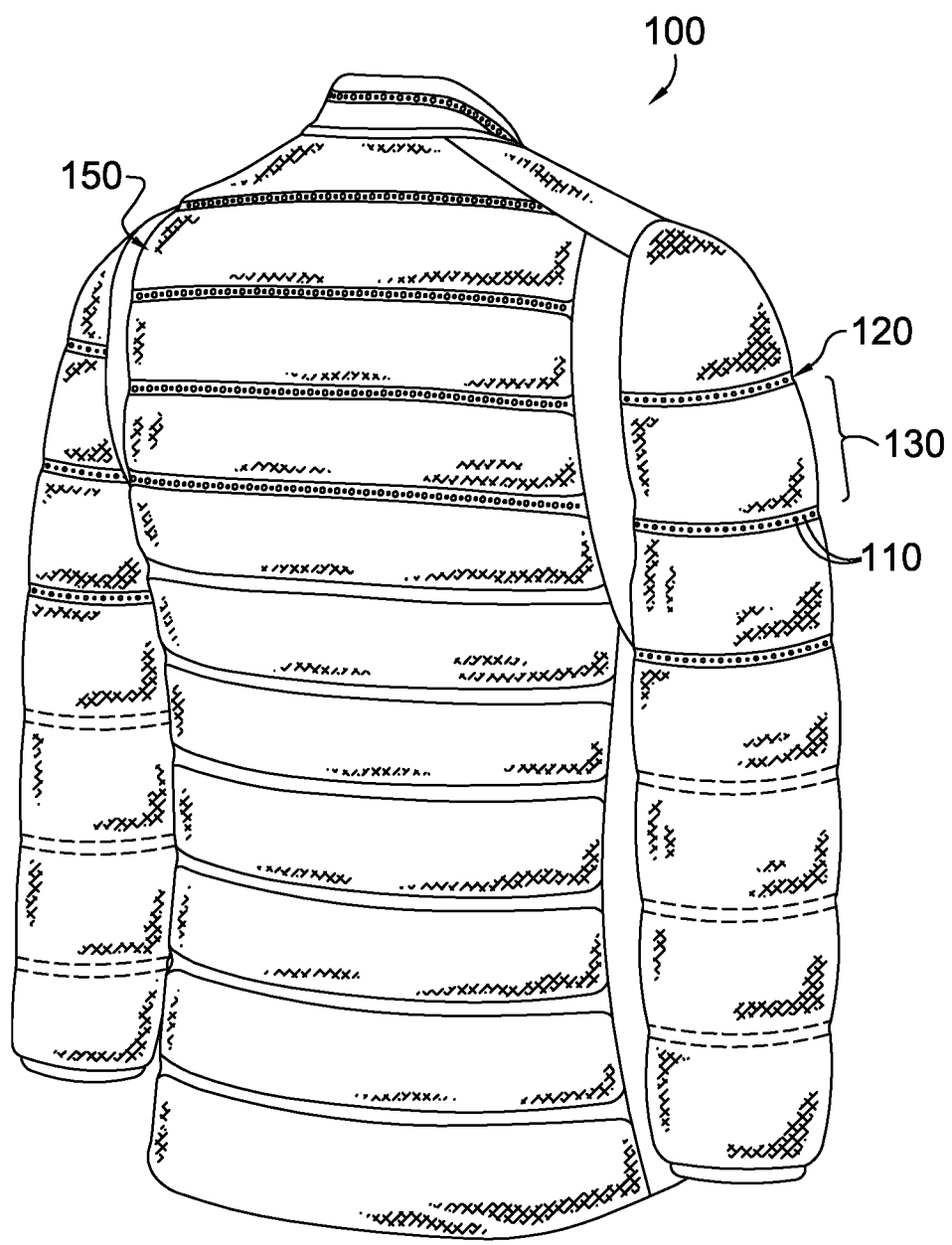

FIGS. 1A and 1B are a front view 140 and a back view 150 of a vented cold weather garment 100 in accordance with the present invention. The vented cold weather garment 100 in FIGS. 1A and 1B may be made from conventional synthetic or natural fabrics. The fabrics may be water repellent and fill proof, or alternatively such as in the case of light fabrics, they may need to be treated with waterproofing and down proofing chemicals such as for example, the chemical treatments referred to as DWR (durable water repellent). Since cold weather garments may be down or synthetic thermal fiber filled, an upside of these treatments, is that they prevent the fill from poking through the fabric and, they prevent water moisture from the environment from entering inside of the garment. A downside of these chemical treatments on fabrics, is that these treatments may create a barrier preventing moisture generated from perspiration to evaporate when the vented cold weather garment is in an as-worn configuration.

The vented cold weather garment in FIGS. 1A and 1B may be constructed by cutting out a first inner panel and a corresponding second outer panel, for each section of the garment, from a fabric piece(s) (not shown). An adhesive tape suitable for the particular type of fabric may be placed on the inner face of one of the panels along predetermined sections of the panel to form chambers with the desired shape. Once the adhesive tape is set in place, the second panel may be aligned on top of the panel with the adhesive tape with its inner face facing the tape. Then, the two panels may be pressed together with sufficient force and/or energy applied, to activate the adhesive tape to create a bond(s) between the two panels. The adhesive tape may be activated by heat, or ultrasonic energy, or any other type of applied energy. Once the fabrics are bonded, seams 120 with chambers 130 in between each adhesive taped region are created. The seams 120 may be spaced apart along the length of the garment (as shown), or seams 120 may be spaced apart lengthwise, perpendicular to the length of the garment, along the width of the garment (not shown). The spacing of seams 120 may vary, as may the relative orientation of the seams and/or the shape of the seams, enabling chambers 130 to be different shapes and/or sizes. The chambers 130 may then be filled with down, or synthetic insulating fabrics. Depending on the size and/or shape of the chambers formed, the chambers may be filled with down or thermal insulating fibers, either manually or mechanically. Further, manual filling may be the preferred method if the chambers 130 are relatively small or irregularly shaped. Seams 120 may be perforated during bonding, after bonding, and/or after filling the chambers. Perforations 110 may be formed using a laser, an ultrasonic cutter, and/or a mechanical cutter. The plurality of perforations 110 may provide ventilation and moisture management by allowing moisture vapor from perspiration to escape to the outer environment. Provided the proper equipment, the seams 120 may be simultaneously formed and perforated in a single step, although the seams and perforations may be formed in separate steps without departing from the scope of the present invention.

In a different example of the garment in accordance with the present invention, depending on the fabric material used, the seams 120 may be created without the use of an adhesive tape. For example if the fabric already has adhesive properties, or is weldable by heat, pressure, or ultrasonic energy, the seams 120 may be created and perforated without the use of adhesive tape.

Figure 2A:
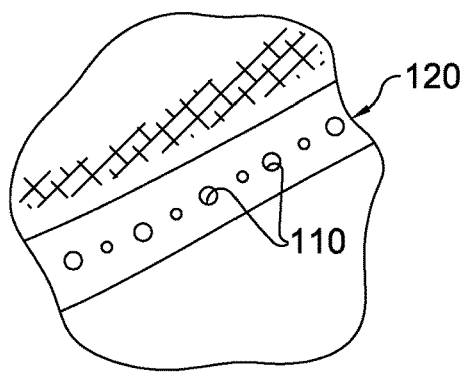
FIG. 2A is a close up view of a section of a venting seam from the cold weather vented garment in FIG. 1A.

FIG. 2A is a close up of a seam 120. The seams 120 formed as described above, may be presented in a straight line (as shown), in a curved line, in a wavy line, or any other shape that may be useful, for example in forming a chamber, and being visually appealing at the same time. The seams 120 may be mechanically perforated by using a welding and cutting wheel assembly, or may be perforated with a laser, an ultrasonic cutter, and/or a mechanical cutter to form the plurality of perforations 110. The plurality of perforations 110 may be of the same size, or different sizes (as shown). The plurality of perforations maybe of different shapes such as circular (as shown), triangular, rectangular, or any other shape desired. The plurality of perforations 110 may be evenly spaced in a straight line, curvy line, zig-zag, or any other suitable shape for placing the plurality of perforations 110 on seams 120, where the plurality of perforations 110 extend through the seams 120. Additionally, depending on the size of the individual perforations, there may be multiple rows of perforations on each seam. The plurality of perforations 110 may be presented continuously along the seams 120 (as shown), or may be presented intermittently along seams 120, or may be strategically placed only in the areas of high perspiration such as along the back of a wearer, under the arms of a wearer, between the legs of a wearer, etc. The size and frequency of the individual perforations 110 may be determined to provide optimal ventilation and breathability, while still maintaining the structural integrity of the fabric, and maintaining a high level of thermal insulation. For example, the width size of each individual perforation in the plurality of perforations 110 may range anywhere from 0.1 mm-5 mm, and the spacing between each individual perforation measured from edge to edge, may range anywhere from 0.5 mm-10 mm. Other sizes and/or spacing of perforations may be used without departing from the scope of the present invention.

Figure 2B:
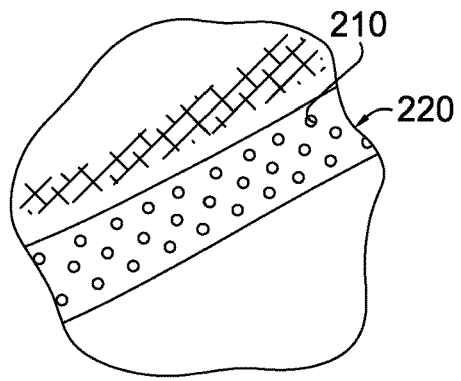
FIG. 2B is a close up view of a section of a different example of a venting seam from a cold weather garment in accordance with the present invention.

FIG. 2B is a close up of a seam 220. The seams 220 formed as described above, may be presented in a straight line (as shown), in a curved line, in a wavy line, or any other shape that may be useful, for example in forming a chamber, and being visually appealing at the same time. The seams 220 may be mechanically perforated by using a welding and cutting wheel assembly, may be perforated with a laser, an ultrasonic cutter, and/or a mechanical cutter, or may be perforated in any other way to form the plurality of perforations 210. The plurality of perforations 210 may be of the same size (as shown), or different sizes. The plurality of perforations maybe of different shapes such as circular (as shown), triangular, rectangular, or any other shape desired. The plurality of perforations 210 may be evenly spaced in a straight line, curvy line, zig-zag, or any other suitable shape for placing the plurality of perforations 210 on seams 220, where the plurality of perforations 210 extend through the seams 220. Additionally, depending on the size of the individual perforations, there may be multiple rows of perforations on each seam. For example, as seen in FIG. 2B, there may be three rows of perforations 210, wherein the perforations 210 of the middle row may or may not be offset from the perforations of the first and third rows. In the case where the perforations 210 of the middle row are offset (as shown), the offset distance may range anywhere from 0 mm-10 mm, or any other distance suitable for the performance and design desired in the final product. While in the present example, only the middle row is offset, all or none of the rows may be offset or, if more rows of perforations are present, different rows may be chosen to be offset. The plurality of perforations 210 may be presented continuously along the seams 220 (as shown), or may be presented intermittently along seams 220, or may be strategically placed only in the areas of high perspiration such as along the back of a wearer, under the arms of a wearer, between the legs of a wearer, etc. The size and frequency of the individual perforations 210 may be determined to provide a desired level of ventilation and breathability, while still maintaining the structural integrity of the fabric and maintaining a desired level of thermal insulation. For example, a desired amount of ventilation, breathability, structural integrity, and thermal insulation may be achieved in a garment using light fabric/textile and down fill with a width size of each individual perforation in the plurality of perforations 210 ranging anywhere from 0.1 mm-5 mm, and the spacing between each individual perforation measured from edge to edge ranging anywhere from 0.5 mm-10 mm, although other sizes and configurations are within the scope of the present invention.

One way of measuring the amount of breathability of a garment, such as garments in accordance with the present invention, may be by performing a hot-plate transfer test, which allows for measurement of the resistance to evaporative transfer of a textile or garment. The lower the resistance number obtained from the test, the less resistance to evaporation there is and therefore, the more evaporation that occurs through the garment in a given amount of time. Garments in accordance with the present invention may be shown to have lower resistance to evaporative transfer than un-perforated garments in hot-plate transfer testing.

Figure 3:
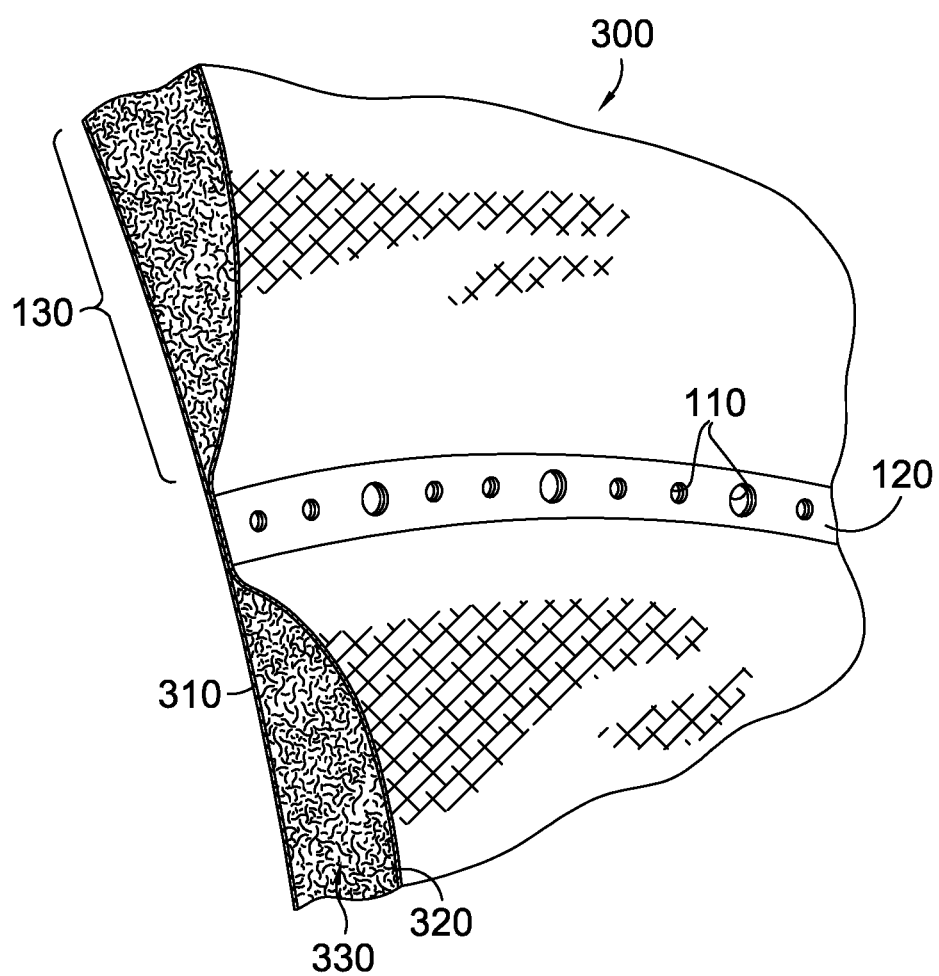
FIG. 3 is a cross-sectional view of a small section of the cold weather vented garment in FIG. 1, where the insulating chambers are shown in relation to the perforated seams.

The garment construction may become more apparent in reference to FIG. 3, where an angled cross-sectional view 300 of a small section of the garment with all the novel features, is shown. The garment in accordance with the present invention may be constructed from a first inner panel 310 and a second outer panel 320. The seams 120 and chambers 130 may be created as described above in reference to FIGS. 1A and 1B, where the chambers 130 are created between pairs of seams 120 between the first inner panel 310 and the first outer panel 320. The plurality of perforations 110 extend through the first inner panel 310 and the second outer panel 320 to provide ventilation and moisture management by allowing moisture vapor from perspiration to escape to the outer environment when the vented cold weather garment is in an as-worn configuration. The chambers 130 may then be filled with a fill 330, such as down or synthetic fibers.

Figure 4:
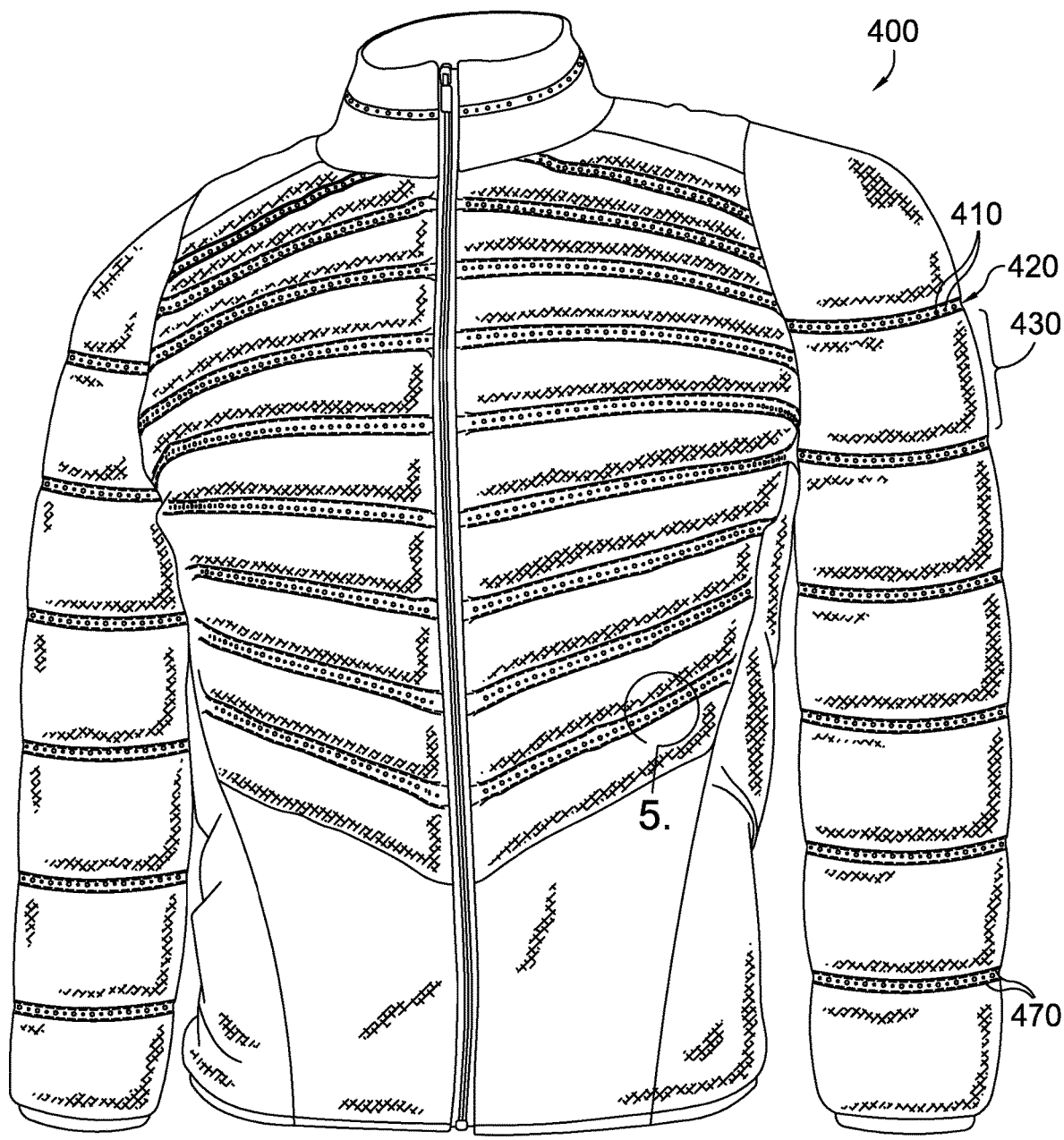
FIG. 4 is a view of a different exemplary cold weather vented garment in accordance with the present invention.

Now, in reference to FIG. 4, a front view of a different cold weather garment 400 in accordance with the present invention is provided. Like the cold weather garment 100 of FIGS. 1A and 1B, the vented cold weather garment 100 in FIG. 4 may be made from conventional synthetic or natural fabrics. The fabrics may be water repellent and down proof, or alternatively such as in the case of ultra-light fabrics (29 g/m² or lower) and light weight fabrics (89 g/m²-30 g/m²), the fabrics may need to be treated with waterproofing and down proofing chemicals such as for example, the chemical treatments referred to as DWR (durable water repellent).

Figure 5:
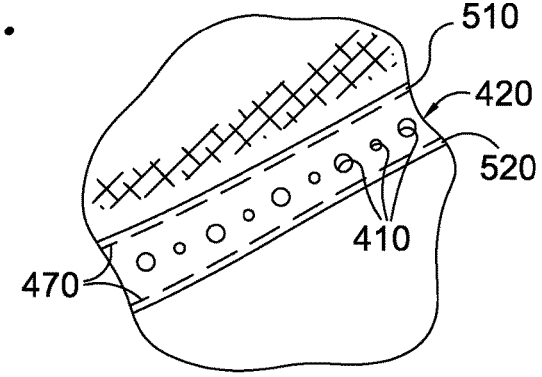
FIG. 5 is a close up view of a section of a venting seam from the cold weather vented garment in FIG. 4.

The cold weather garment in FIG. 4 may be constructed in a fashion similar to that described above with regard to the garment shown in FIGS. 1A and 1B to form seams 420 to create chambers to hold fill material, with a plurality of perforations 410 formed in seams 420. The seams 420 may be further reinforced by adding stitching 470 along their upper edge/boundary 510 and/or lower edge/boundary 520, as can be seen in the close up view of FIG. 5.

Stitching 470 may be applied mechanically and/or by hand, and may use any type of thread, whether natural or synthetic. Stitching 470 may be applied before or after applying pressure and/or energy to form seams 420. Likewise, stitching 470 may be applied before or after perforations 410 and/or before or after chambers 430 are filled.

Figure 6:
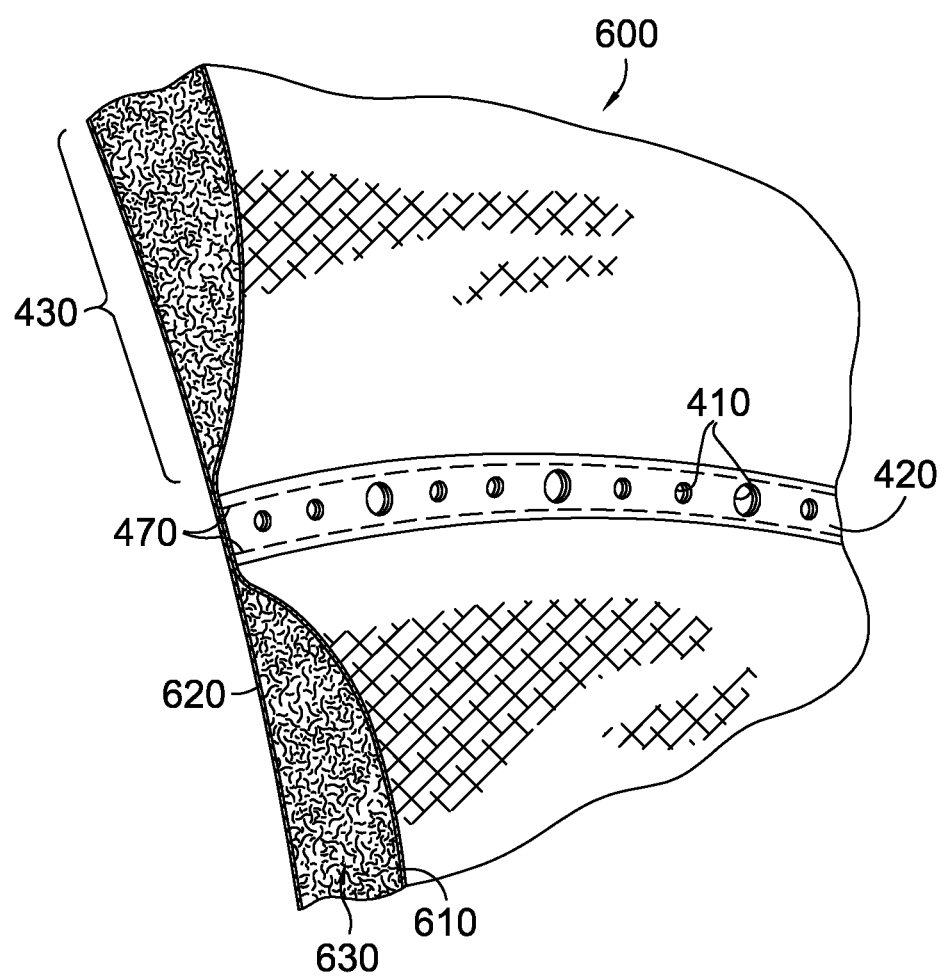
FIG. 6 is a cross-sectional view of a small section of the cold weather vented garment in FIG. 4, where the insulating chambers are shown in relation to the perforated seams.

The garment construction may become more apparent in reference to FIG. 6, where an angled cross-sectional view 600 of a small section of the garment with all the novel features, is shown. The garment in accordance with the present invention may be constructed from a first inner panel 620 and a second outer panel 610. The seams 420 and chambers 430 may be created as described above in reference to FIG. 4. The chambers may then be filled with fill 630, such as down or synthetic fibers.

Alternatively, in a further different example of the garment in accordance with the present invention, the seams 420 may be produced by omitting the adhesive tape layer altogether. In other words, the seams 420 may be created simply by stitching 470 along the upper seam boundary 510 and lower seam boundary 520. The plurality of perforations 410 may then be placed in between the stitched boundaries. This example may be pictured better in reference to FIG. 5.

The insulating chambers in the garments in accordance with the present invention may be formed by welding separate pieces of fabric at each seam, or as discussed earlier, may be formed by pressing two whole panels with adhesive tape in strategic places in between the two panels. If the chambers were formed by welding separate pieces of fabric at each seam, this would allow for the introduction of different textures, colors, or functionalities by introducing different types of fabrics at different sections of the garment.

Figure 7A:
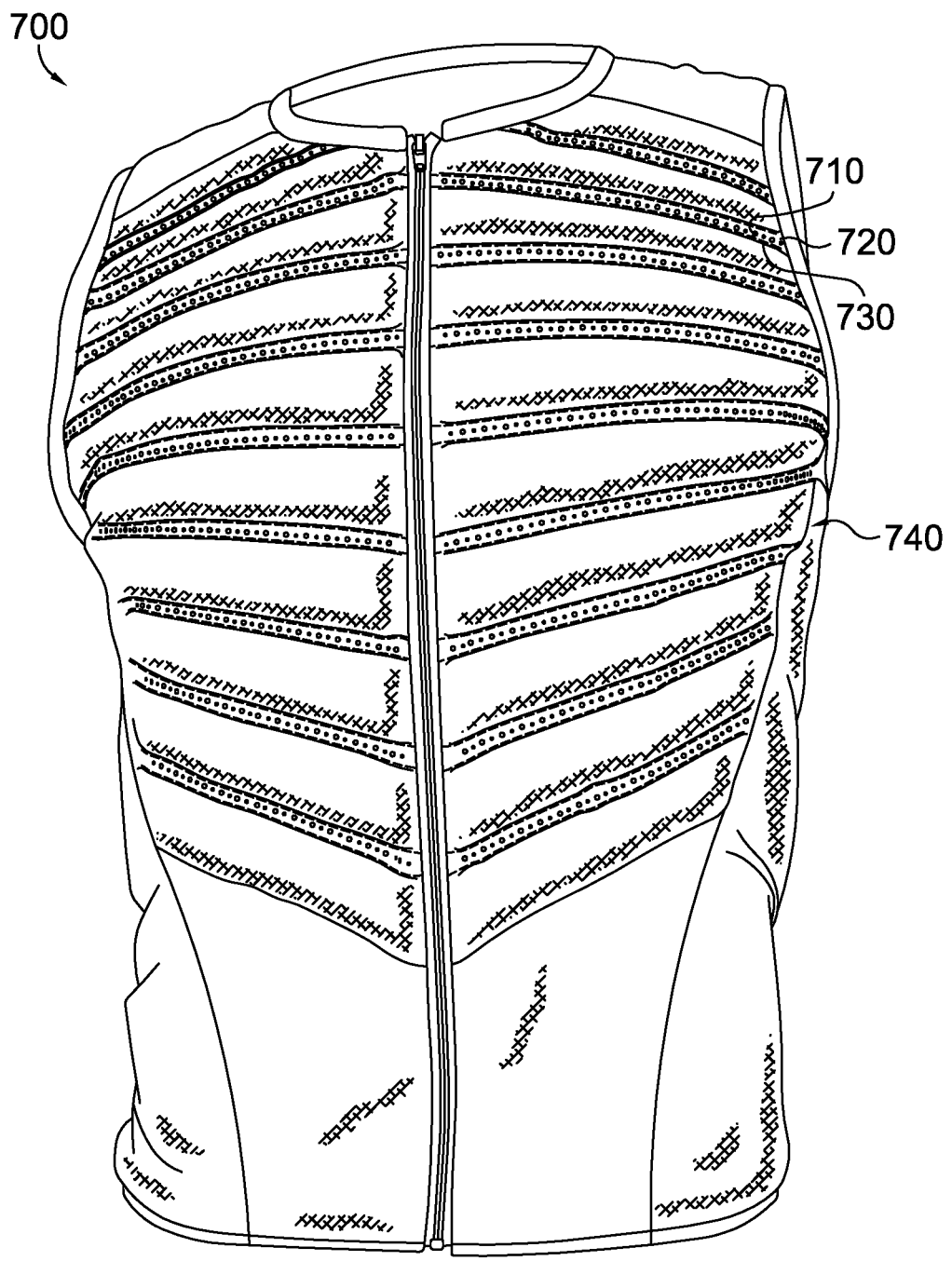
FIGS. 7A and 7B depict front and back view of an additional exemplary cold weather vented garment in accordance with the present invention.
Figure 7B:
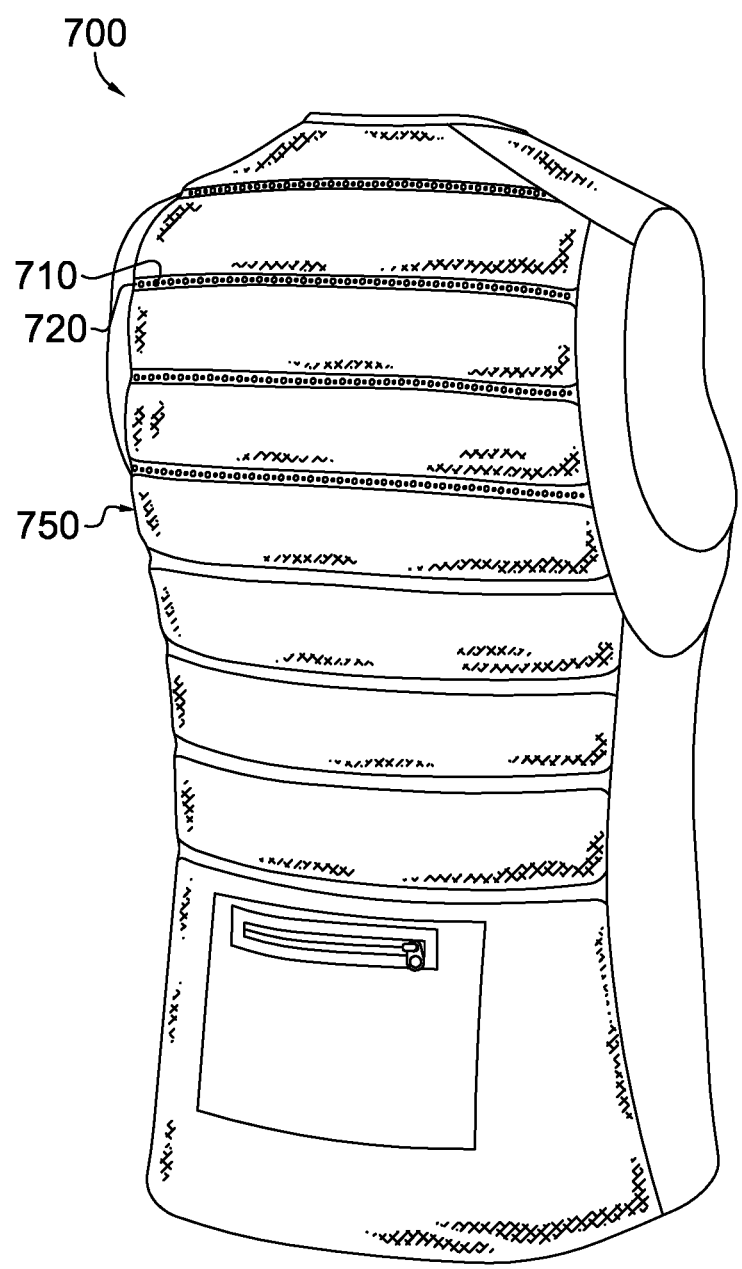

Further, the vented cold weather insulating garment examples shown in the examples of FIGS. 1A, 1B, and FIG. 4 are vented cold weather jackets or coats. However, the insulating vented garments in accordance with the present invention may also be constructed in the form of vests, pants, overalls, gloves, hats, etc. FIGS. 7A and 7B depict an example vest 700 in accordance with the present invention, with FIG. 7A depicting a front view 740 and FIG. 7B depicting a back view 750 of the exemplary vest 700. As seen in FIGS. 7A and 7B, the vest 700 may have seams 720 with a plurality of perforations 710, forming thermally insulating chambers 740, which may be filled with down, or any other thermally insulating material, such as polyester fibers. The vest 700 may or may not have stitches along the edges of seams 720 for reinforcement of the seams. The vest 700 may be used as a light weight breathable thermal insulation garment, for example by a runner.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

The invention claimed is:

1. A garment comprising:
   a garment forming panel adapted to cover an upper body portion of a wearer when the garment is in an as-worn configuration;
   wherein the garment forming panel comprises:
   (1) an inner layer configured to face the wearer when the garment is in the as-worn configuration;
   (2) an outer layer configured to be exposed to an external environment when the garment is in the as-worn configuration;
   (3) one or more seams that join the inner layer and the outer layer, wherein each seam of the one or more seams is defined by a first edge and a second edge;
   (4) at least one chamber formed between the inner layer and the outer layer that holds and contains
   a thermally insulating fill material, wherein the thermally insulating fill material comprises at least one of down and a synthetic fiber; and
   (5) at least one perforation located between the first edge and the second edge of at least one seam of the one or more seams, wherein the at least one perforation extends through the at least one seam of the one or more seams, through the inner layer, and through the outer layer.

2. The garment of claim 1, wherein the one or more seams that join the inner layer and the outer layer are formed by one of bonding using an adhesive, stitching, or bonding using an adhesive and stitching.

3. The garment of claim 1, wherein the inner layer comprises a textile material that weighs 89 $g/m^2$ or less.

4. A garment comprising:
   a garment forming panel adapted to cover an upper body portion of a wearer when the garment is in an as-worn configuration, wherein the garment forming panel comprises:
   (1) an inner layer configured to face the wearer when the garment is in the as-worn configuration;
   (2) an outer layer configured to be exposed to an external environment when the garment is in the as-worn configuration, wherein the inner layer and the outer layer are joined together by at least one seam, wherein the at least one seam is defined by a first edge and a second edge, and wherein the inner layer and the outer layer are continuously joined to each other between the first edge and the second edge of the at least one seam;
   (3) at least one chamber formed between the inner layer and the outer layer that holds and contains
   a thermally insulating fill material, wherein the thermally insulating fill material comprises at least one of down and a synthetic fiber; and
   (4) at least one perforation located between the first edge and the second edge of the at least one seam, wherein the at least one perforation extends through the at least one seam, through the inner layer, and through the outer layer.

* * * * *